United States Patent
Liu

(10) Patent No.: US 11,673,302 B2
(45) Date of Patent: Jun. 13, 2023

(54) MOLD FOR ENCAPSULATING A PIN-FIN TYPE POWER MODULE AND METHOD FOR MANUFACTURING A POWER MODULE

(71) Applicant: ZF Friedrichshafen AG, Friedrichshafen (DE)

(72) Inventor: Wei Liu, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/375,525

(22) Filed: Jul. 14, 2021

(65) Prior Publication Data

US 2022/0016814 A1    Jan. 20, 2022

(30) Foreign Application Priority Data

Jul. 15, 2020 (DE) ...................... 10 2020 208 862.4

(51) Int. Cl.
  *B29C 45/14* (2006.01)
  *H01L 21/56* (2006.01)
  *B29L 31/34* (2006.01)
  *B29C 45/17* (2006.01)

(52) U.S. Cl.
  CPC .................. *B29C 45/14065* (2013.01); *B29C 2045/14139* (2013.01); *B29C 2045/14852* (2013.01); *B29C 2045/1785* (2013.01); *B29C 2791/006* (2013.01); *B29L 2031/3481* (2013.01)

(58) Field of Classification Search
  CPC .... B29C 45/14065; B29C 2045/14098; B29C 2045/14139; B29C 2045/14852; H01L 21/56; H01L 21/565
  See application file for complete search history.

(56) References Cited

U.S. PATENT DOCUMENTS

| 4,823,234 | A | * | 4/1989 | Konishi | ................ H01L 23/145 29/841 |
| 4,890,152 | A | * | 12/1989 | Hirata | .................... H05K 3/306 257/713 |
| 5,144,412 | A | * | 9/1992 | Chang | .................. H05K 7/1084 361/783 |
| 5,289,039 | A | * | 2/1994 | Ishida | ................... H01L 21/565 257/796 |

(Continued)

FOREIGN PATENT DOCUMENTS

DE     102018211718 A1 * 1/2020
WO    WO-2019145154 A1 * 8/2019   ........... H01L 21/565

*Primary Examiner* — Robert B Davis
(74) *Attorney, Agent, or Firm* — Dority & Manning, P.A.

(57) ABSTRACT

A mold for encapsulating a Pin-Fin type power module with resin is disclosed. The power module includes a DBC or IMS, power chips and multiple terminals provided on a first surface of the DBC or IMS and a Pin-Fin structure provided on a second surface of the DBC or IMS. The mold further includes: a cavity for containing the power module; multiple terminal protecting elements corresponding to the terminals, respectively, each for receiving at least a part of a terminal; and an injection hole provided on the bottom of the mold or on the side wall of the mold, The first surface faces the bottom of the mold and the injection hole is below the first surface when the power module is placed in the cavity. A method for manufacturing a power module is also provided.

11 Claims, 4 Drawing Sheets

(56) References Cited

U.S. PATENT DOCUMENTS

| | | | | |
|---|---|---|---|---|
| 5,609,889 A | * | 3/1997 | Weber | B29C 45/14655 |
| | | | | 425/117 |
| 5,753,538 A | * | 5/1998 | Kuno | B29C 45/34 |
| | | | | 264/272.17 |
| 7,144,538 B2 | * | 12/2006 | Lee | H01L 23/49562 |
| | | | | 438/122 |
| 2002/0001880 A1 | * | 1/2002 | Kobayashi | H01L 23/66 |
| | | | | 257/E23.125 |
| 2010/0208427 A1 | * | 8/2010 | Horiuchi | H05K 7/20927 |
| | | | | 361/699 |

* cited by examiner

MOLD FOR ENCAPSULATING A PIN-FIN TYPE POWER MODULE AND METHOD FOR MANUFACTURING A POWER MODULE

CROSS-REFERENCE TO RELATED APPLICATION

The present application is related and has right of priority to German Patent Application No. 102020208862.4 filed in the German Patent Office on Jul. 15, 2020, which is incorporated by reference in its entirety for all purposes.

FIELD OF THE INVENTION

The invention relates generally to a mold for encapsulating a Pin-Fin type power module and a method for manufacturing the Pin-Fin type power module.

BACKGROUND OF THE INVENTION

Refer to FIG. 1, a traditional power module before packaging is disclosed. Power chips 2 like IGBTs or SiC devices are provided on the front surface of a DBC (Direct Bonded Copper) or IMS (Insulated Metal Substrate) 1, as well as terminals 31, 32 like an AC connector and a DC connector of an inverter. A metal block 4 for heat dissipating is coupled to the rear surface of the DBC or IMS 1. Gel or resin are normally used for encapsulating the power chips 2, the terminals 31, 32 and the front surface of the DBC or IMS. If epoxy resin is used, the power module can be encapsulated by a transfer molding process. Refer to FIG. 2, a lower mold 51 is provided with an injection hole 511, and the lower mold 51 and the upper mold 52 define a cavity 50 for containing the structure as shown in FIG. 1. The epoxy resin is injected via the injection hole 511 upwards and the cavity 50 will be filled with epoxy resin under a specific pressure. The metal block 4 can provide good support during transfer molding process. After the lower mold and the upper mold are removed, a packaged power module with the epoxy resin 6 is formed, as shown in FIG. 3. However, except from the power chips 2, the terminals 31,32 are also fully encapsulated by the epoxy resin 6. An additional drilling process is necessary since the terminals need to be exposed for electrical connection.

Besides, in order to improve heat dissipating capability, a Pin-Fin structure is used instead of the metal block. As shown in FIG. 4, the Pin-Fin structure is coupled to the rear surface of the DBC or IMS 1 and comprises a metal plate 41 and multiple Fins 42 on the metal plate 41. Heat generated during the power chip's rapid switching can be dissipated quickly through Fins 42. As shown in FIG. 5 and FIG. 6, if the power module with Pin-Fin structure is placed in the cavity 50 formed by the lower mold 51 and the upper mold 52, the gap between two adjacent Fins will also be filled with epoxy resin, which is unacceptable.

BRIEF SUMMARY

In order to avoid the Fins and the terminals from being encapsulated by the resin, example aspects of the present invention provide a mold for encapsulating a Pin-Fin type power module with resin. The power module includes a DBC or IMS, power chips and multiple terminals provided on a first surface of the DBC or IMS, and a Pin-Fin structure provided on a second surface of the DBC or IMS opposite to the first surface. The mold further includes a cavity for containing the power module, multiple terminal protecting elements corresponding to the terminals, respectively, each for receiving at least a part of a terminal, an injection hole provided on the bottom of the mold or on the side wall of the mold, wherein the first surface is facing the inner bottom surface of the mold and the injection hole is below the first surface when the power module is placed in the cavity.

In a preferred example embodiment, the terminal protecting element is a recess provided on the inner bottom surface of the mold.

In another preferred example embodiment, the recess wraps at least a part of the corresponding terminal. For instance, the recess wraps the top of the corresponding terminal.

In another preferred example embodiment, the depth of the recess is shallower than the height of the corresponding terminal. Thus, the portion not received by the recess of each terminal is immersed in the resin during transfer molding process, and after the resin is solidified, the portion not received by the recess of each terminal is encapsulated. Meanwhile, the portion received by the recess of each terminal protrudes out of the solidified resin, thus no additional drilling process is needed in order to form the electrical connection.

In another preferred example embodiment, the inner wall of the recess is elastic. Preferably, the inner wall of the recess is covered by an elastic layer, like rubber layer.

In another preferred example embodiment, the Pin-Fin structure includes a metal plate coupled to the DBC or IMS and Fins provided on the metal plate, the metal plate includes a central region provided with the Fins and an edge region with no Fin, the edge region is around the central region. When the resin is injected upwards, the edge region could prevent the Fins from being affected by the resin during the transfer molding.

In another preferred example embodiment, a step portion is provided on the inner bottom surface of the mold for supporting the periphery of the first surface.

In another preferred example embodiment, the mold is assembled by an upper mold and a lower mold, the cavity is formed by the inner wall of the upper mold and the inner wall of the lower mold, the terminal protecting elements and the injection hole are provided on the lower mold.

According to another example aspect of the invention, a method for manufacturing the Pin-Fin type power module is also disclosed. The method for manufacturing a power module by using the above-mentioned mold, the method includes: placing the power module in the lower mold, wherein at least a part of each terminal is received by the corresponding terminal protecting element; assembling the upper mold and the lower mold; injecting epoxy resin via the injection hole so that the first surface is encapsulated with epoxy resin; and removing the upper mold and the lower mold.

In another preferred example embodiment, before injecting epoxy resin, the cavity is evacuated.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying

DETAILED DESCRIPTION OF THE EMBODIMENTS

Figure 1:
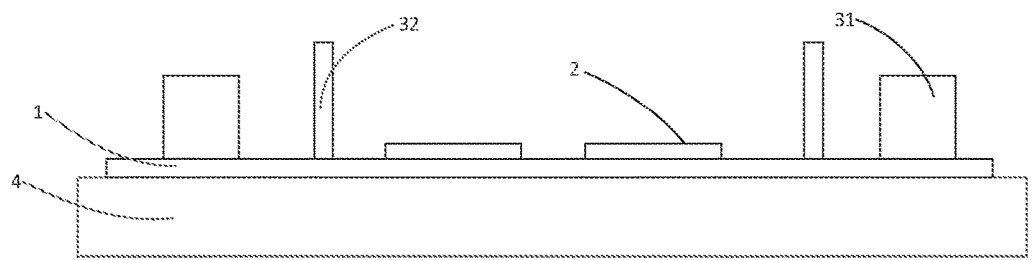
FIG. 1 illustrates a cross sectional view of a traditional power module before packaging.
Figure 2:
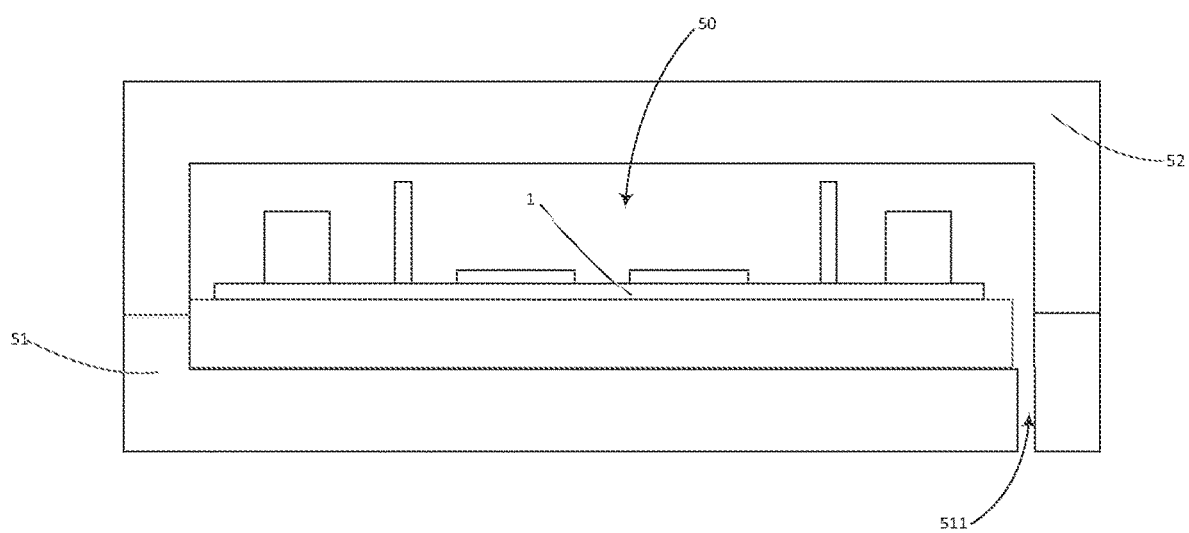
FIG. 2 illustrates a cross sectional view of a traditional mold for encapsulating the power module as shown in FIG. 1.
Figure 3:
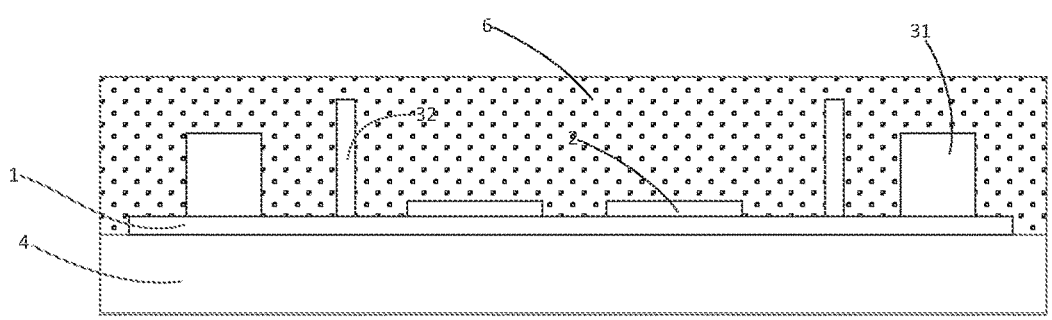
FIG. 3 illustrates a cross sectional view of a resin encapsulated power module after the mold is removed in prior art.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 4:
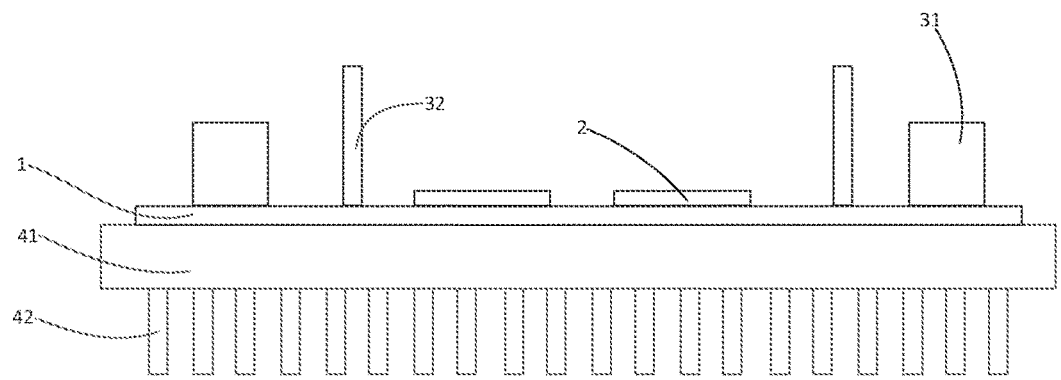
FIG. 4 illustrates a cross sectional view of a power module with Pin-Fin structure before packaging.
Figure 5:
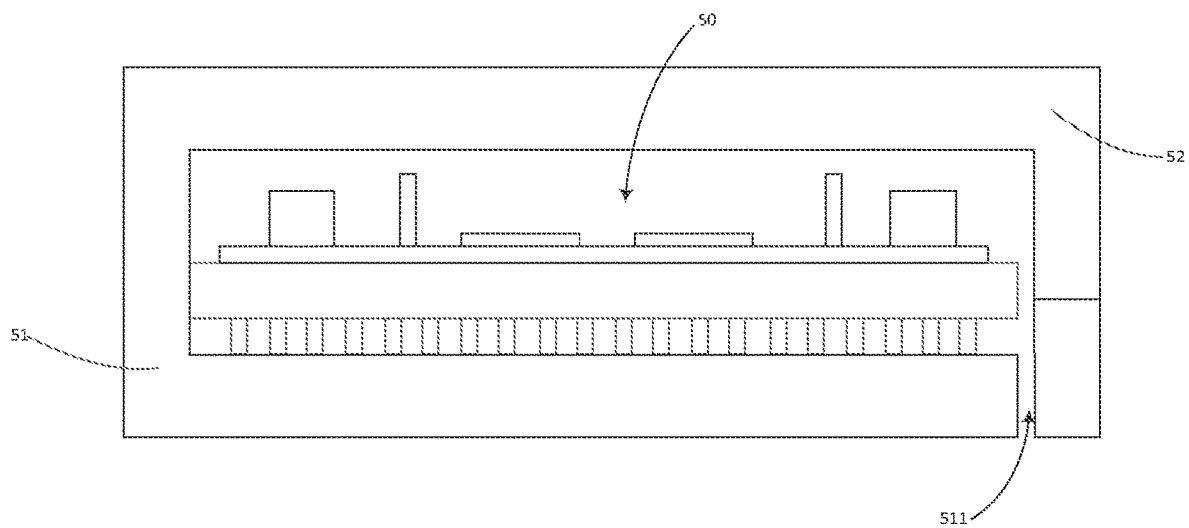
FIG. 5 illustrates a cross sectional view of the power module as shown in FIG. 4 being placed in the mold in prior art.
Figure 6:
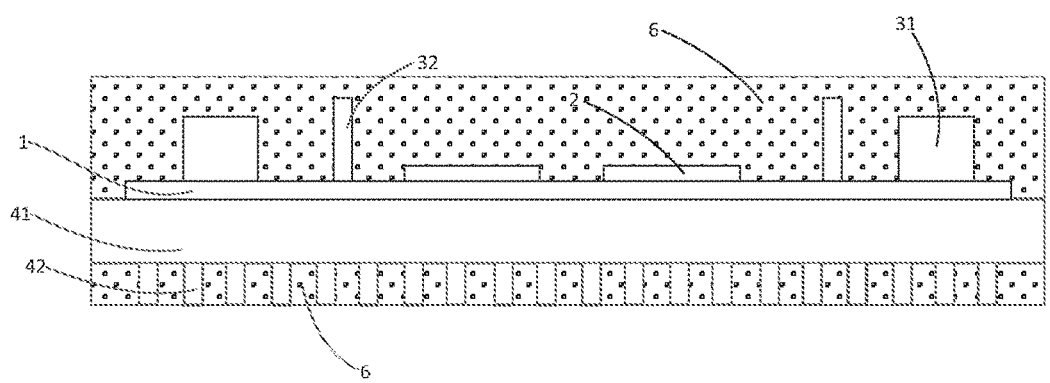
FIG. 6 illustrates cross sectional view of a resin encapsulated power module with Pin-Fin structure after the mold is removed in prior art.

Referring now to the drawings, example embodiments of the invention are described in detail. A mold for encapsulating a Pin-Fin type power module with resin and a method for manufacturing the Pin-Fin type power module are described in detail with reference to FIG. 4, FIG. 7-FIG. 9. As shown in FIG. 4, the power module comprises a DBC or IMS 1, power chips 2, multiple terminals 31, 32 provided on a first surface of the DBC or IMS 1, and a Pin-Fin structure provided on a second surface of the DBC or IMS 1 opposite to the first surface. The power chips, such as SiC devices and the terminals, like AC connectors and DC connectors, are welded on the DBC or IMS. The Pin-Fin structure includes a metal plate 41 coupled to the DBC or IMS 1 and Fins 42 provided on the metal plate 41. The metal plate 41 is coupled to the DBC or IMS by a thermal glue so that the heat generated during the switching of the power chips is transferred to the Fins 42 which are immersed in cooling agent.

Figure 7:
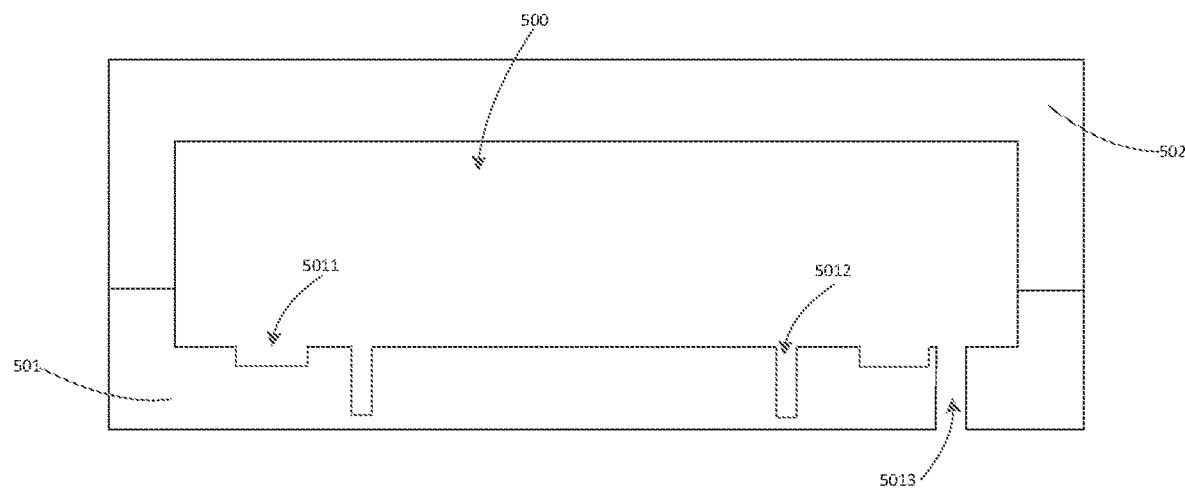
FIG. 7 illustrates a cross sectional view of a mold for encapsulating the power module with Pin-Fin structure in accordance with an example embodiment of the invention.
Figure 8:
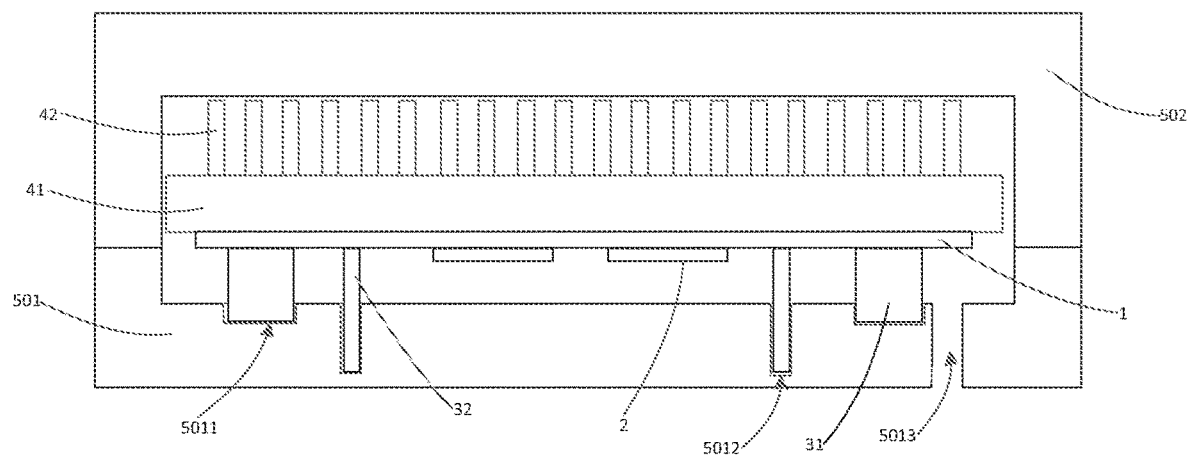
FIG. 8 illustrates a cross sectional view of a power module with Pin-Fin structure being placed in the mold of FIG. 7.

Refer to FIG. 7 and FIG. 8, the mold includes a lower mold 501 and an upper mold 502. A cavity 500 for containing the power module as shown in FIG. 4 is formed by the lower mold 501 and the upper mold 502. On the inner bottom surface of the lower mold 501, multiple terminal protecting elements 5011, 5012 respectively corresponding to the terminals 31, 32 are provided, each for receiving at least a part of a terminal. The depth of the recess is shallower than the height of the corresponding terminal. Each terminal protecting element is a recess with elastic layer. Thus, when the power module is placed in the cavity 500 with the Fins 42 upwards and terminals downwards, each terminal is well protected because a part of each terminal, for example the top of each terminal is wrapped by the elastic layer of each recess.

The lower mold 501 further includes an injection hole 5013 provided on the bottom of the mold, wherein the first surface of the DBC or IMS is facing the bottom of the mold and the injection hole is below the first surface when the power module is placed in the cavity. The epoxy resin is injected into the cavity 500 via the injection hole 5013.

Different from a traditional mold with a plane bottom, the power module is placed in a reversed way with terminals well protected. Portions of the terminals which are not received by the terminal protecting elements are exposed to the epoxy resin injected via the injection hole 5013.

Figure 9:
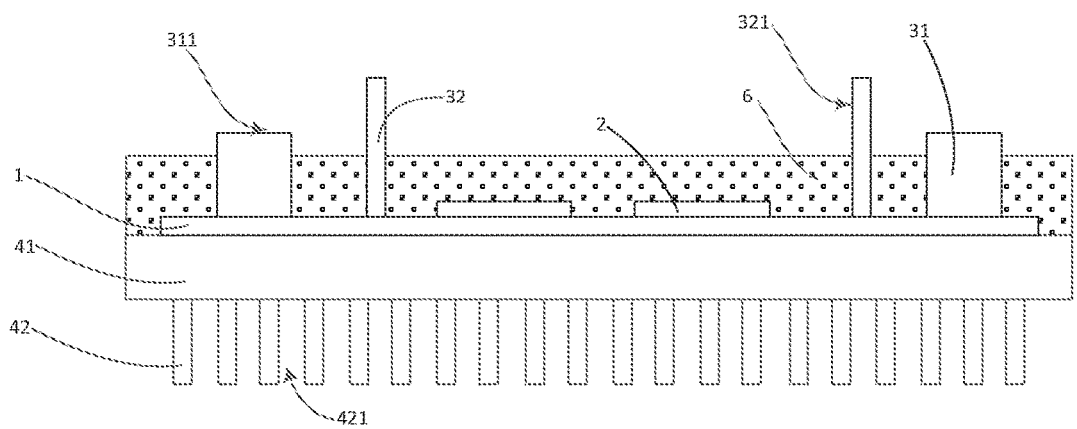
FIG. 9 illustrates a cross sectional view of the encapsulated power module of FIG. 8 with the mold being removed.

Example aspsects of the present invention further provide a method for manufacturing a power module by using the above-mentioned mold, including: placing the power module in the lower mold, in which the top of each terminal is received by the corresponding terminal protecting element; assembling the upper mold and the lower mold to form the cavity 500; and injecting epoxy resin via the injection hole 5013 upwards, during which power chips and exposed terminals are immersed in the epoxy resin as the epoxy resin flows. After the epoxy resin is solidified, the mold is removed and an encapsulated power module as shown in FIG. 9 is accomplished. With the protection of the terminal protecting elements, the top 311, 321 of each terminal 31, 32 are not encapsulated by the epoxy resin and thus exposed, which is desirable for electrical connection and no additional drilling process is needed as compared to the transfer molding process using a traditional mold.

Figure 10:
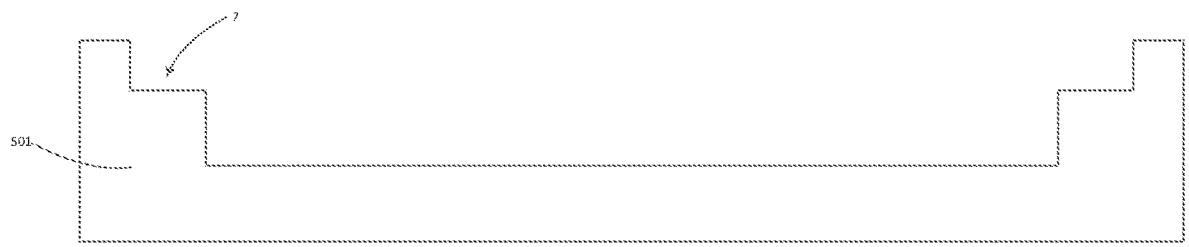
FIG. 10 illustrates a cross sectional view of a lower mold for encapsulating a power module with Pin-Fin structure in accordance with another example embodiment of the invention.
Figure 11:
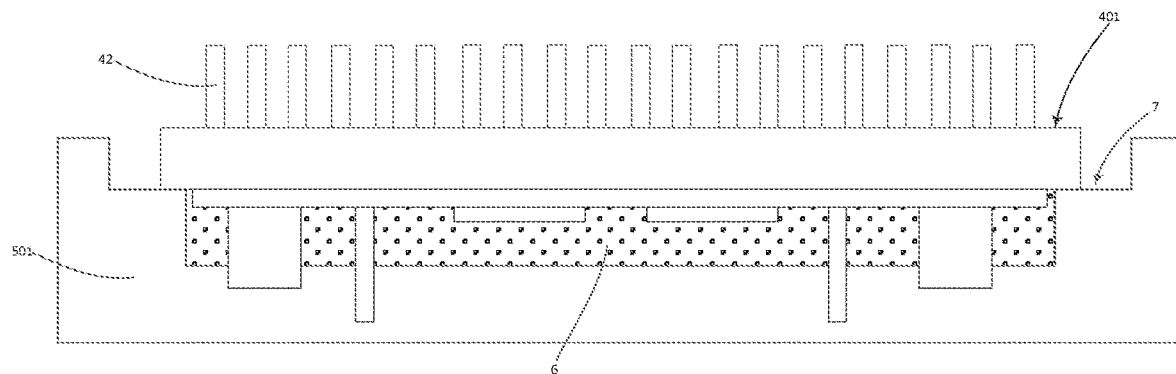
FIG. 11 illustrates a cross sectional view of a power module with Pin-Fin structure, which is placed in the lower mold of FIG. 10.

Now refer to FIG. 10-FIG. 11, another preferred example embodiment is disclosed. A metal plate includes a central region provided with Fins and an edge region 401 with no Fin around the central region. When resin is injected upwards, the edge region could prevent the Fins from being affected by the resin during transfer molding.

In this example embodiment, a step portion 7 is provided on the inner bottom surface of a lower mold 501 for supporting the periphery of the first surface, and an injection hole is provided on the side wall of the lower mold. As shown in FIG. 11, the step portion 7 prevents the epoxy resin from affecting the side wall of the metal plate and the Fins 42.

Figure 12:
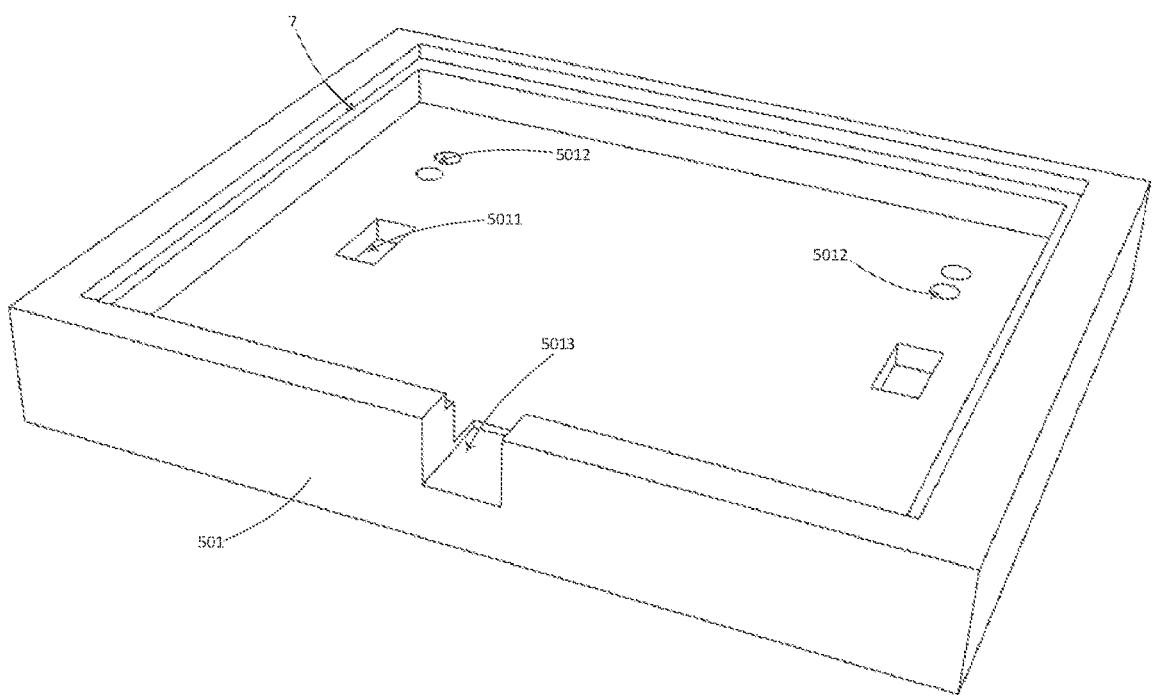
FIG. 12 illustrates a perspective view of a lower mold in accordance with another embodiment of the invention.

Now refer to FIG. 12, a lower mold 501 in accordance with another preferred example embodiment of the invention is illustrated. This example embodiment is similar to the example embodiment as shown in FIG. 10-11, a step portion 7 is provided on the inner bottom surface of a lower mold 501 for supporting the periphery of the first surface. Multiple terminal protecting elements 5011, 5012 with inner rubber elements are provided on the floor of the lower mold, and an injection hole 5013 is provided on the side wall of the lower mold. The highest position of the injection hole is below the first surface when the power module is placed in the cavity.

A number of alternative structural elements and processing steps have been suggested for the preferred embodiment. Thus while the invention has been described with reference to specific embodiments, the description is illustrative of the invention and is not to be construed as limiting the invention. Various modifications and applications may occur to those skilled in the art without departing from the true spirit and scope of the invention as defined by the appended claims.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

I claim:

1. A mold for encapsulating a Pin-Fin type power module with resin, the power module comprising a Direct Bonded Copper, DBC, or Insulated Metal Substrate, IMS, a plurality of power chips and a plurality of terminals provided on a first surface of the DBC or IMS, a Pin-Fin structure provided on a second surface of the DBC or IMS, the second surface being opposite to the first surface, the mold comprising:
   a cavity for containing the power module;
   a plurality of terminal protecting elements corresponding to the plurality of terminals, each of the plurality of terminal protecting elements receiving at least a portion of a respective terminal of the plurality of terminals; and
   an injection hole provided on the bottom of the mold or on the side wall of the mold,
   wherein the first surface of the DBC or IMS faces an inner bottom surface of the mold when the power module is placed in the cavity, and the injection hole is below the first surface of the DBC or IMS when the power module is placed in the cavity.

2. The mold of claim 1, wherein at least one of the plurality of terminal protecting elements is a recess provided on the inner bottom surface of the mold.

3. The mold of claim 2, wherein the recess wraps at least a portion of the respective terminal when the power module is placed in the cavity.

4. The mold of claim 2, wherein a depth of the recess is less than a height of the respective terminal.

5. The mold of claim 2, wherein an inner wall of the recess is formed of plastic.

6. The mold of claim 1, wherein the Pin-Fin structure comprises a metal plate coupled to the DBC or IMS, the metal plate comprises a central region provided with Fins and an edge region without Fins, and the edge region is positioned around the central region.

7. The mold of claim 1, wherein the mold further comprises a step portion on the inner bottom surface of the mold for supporting the periphery of the first surface.

8. The mold of claim 1, wherein the mold comprises an upper mold portion and a lower mold portion, the cavity is formed by an inner wall of the upper mold and an inner wall of the lower mold, and the terminal protecting elements and the injection hole are provided on the lower mold.

9. A method for manufacturing a power module using the mold of claim 8, the method comprising:
   placing the power module in the lower mold, wherein at least the portion of each terminal is received by the respective terminal protecting element;
   assembling the upper mold and the lower mold;
   injecting epoxy resin via the injection hole so that the first surface is encapsulated with the epoxy resin; and
   removing the upper mold and the lower mold.

10. The method of claim 9, further comprising evacuating the cavity before injecting the epoxy resin.

11. A method for manufacturing a Pin-Fin type power module, the power module comprising a Direct Bonded Copper, DBC, or Insulated Metal Substrate, IMS, a plurality of power chips and a plurality of terminals provided on a first surface of the DBC or IMS, a Pin-Fin structure provided on a second surface of the DBC or IMS, the second surface being opposite to the first surface, the method comprising:
   placing the power module in a cavity such that each of a plurality of terminal protecting elements receives at least a portion of a respective terminal of the plurality of terminals, such that the first surface of the DBC or IMS faces an inner bottom surface of the mold, and such that an injection hole on a bottom of the mold or on a side wall of the mold is below the first surface of the DBC or IMS; and
   injecting epoxy resin via the injection hole so that the first surface is encapsulated with the epoxy resin.

* * * * *